(12) United States Patent
Jeong

(10) Patent No.: US 8,824,810 B2
(45) Date of Patent: Sep. 2, 2014

(54) METHOD AND APPARATUS FOR ENCODING/DECODING IMAGE IN BITMAP FORMAT USING REDUCED NUMBER OF BITMAP INDICES

(75) Inventor: Young-hoon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 845 days.

(21) Appl. No.: 12/550,461

(22) Filed: Aug. 31, 2009

(65) Prior Publication Data
US 2010/0166326 A1    Jul. 1, 2010

(30) Foreign Application Priority Data
Dec. 31, 2008   (KR) ........................ 10-2008-0138724

(51) Int. Cl.
*G06K 9/36*   (2006.01)

(52) U.S. Cl.
USPC .......................................... 382/232; 382/261

(58) Field of Classification Search
CPC ........ H04N 7/50; H04N 7/30; H04N 7/26085
USPC ............. 345/606, 63, 88, 587, 596, 634, 690; 382/166, 237, 261; 348/222.1, 441
See application file for complete search history.

(56) References Cited

U.S. PATENT DOCUMENTS

| | | | |
|---|---|---|---|
| 4,857,899 A | 8/1989 | Ishii | |
| 5,426,468 A | 6/1995 | Jenison | |
| 5,500,654 A * | 3/1996 | Fujimoto | 345/634 |
| 5,712,651 A * | 1/1998 | Tomiyasu | 345/88 |
| 5,845,312 A * | 12/1998 | Kimura et al. | 711/105 |
| 6,259,439 B1 | 7/2001 | Lippincott | |
| 6,401,190 B1 * | 6/2002 | Nishioka et al. | 712/24 |
| 6,501,482 B1 * | 12/2002 | Rosman et al. | 345/587 |
| 6,587,117 B1 | 7/2003 | Wright et al. | |

(Continued)

FOREIGN PATENT DOCUMENTS

| | | |
|---|---|---|
| CN | 101192212 A | 6/2008 |
| CN | 101625848 A | 1/2010 |

(Continued)

OTHER PUBLICATIONS

International Search Report dated Jul. 6, 2010, issued by the International Searching Authority of the PCT in counterpart Application No. PCT/KR2009/006560.

(Continued)

*Primary Examiner* — Vikkram Bali
*Assistant Examiner* — Xuemei Chen
(74) *Attorney, Agent, or Firm* — Sughrue Mion, PLLC

(57) ABSTRACT

An apparatus and a method of encoding/decoding an image are provided. The method includes generating a bitmap table by mapping a quantized image, that is quantized according to a predetermined bit-depth, to a map table, and setting a bitmap index corresponding to each pixel location of the quantized image with reference to the bitmap table; setting a fixed filter index corresponding to an image of each pixel of the image by analyzing local characteristics of the image; generating bitmap data by adding the filter index to the bitmap index; extracting a bitmap index, a bitmap table, and a filter index from the bitmap data; extracting an encoded image mapped to the bitmap index from the bitmap table; and filtering the extracted encoded image based on a filter corresponding to the filter index.

18 Claims, 7 Drawing Sheets

(56) References Cited

U.S. PATENT DOCUMENTS

| | | | |
|---|---|---|---|
| 6,731,299 B2* | 5/2004 | Wang et al. | 345/596 |
| 7,016,981 B2* | 3/2006 | Ervin | 710/1 |
| 7,224,843 B2* | 5/2007 | Jeong | 382/237 |
| 7,369,161 B2* | 5/2008 | Easwar et al. | 348/222.1 |
| 7,408,587 B2* | 8/2008 | Matsutani et al. | 348/441 |
| 7,716,267 B2* | 5/2010 | Ito et al. | 708/513 |
| 7,719,721 B2* | 5/2010 | Kashibuchi | 358/3.13 |
| 7,843,474 B2* | 11/2010 | Lee et al. | 345/690 |
| 8,050,509 B2* | 11/2011 | Jeong et al. | 382/261 |
| 2003/0189729 A1 | 10/2003 | Kang et al. | |
| 2004/0120399 A1 | 6/2004 | Kato | |
| 2005/0083935 A1* | 4/2005 | Kounavis et al. | 370/392 |
| 2005/0213122 A1* | 9/2005 | Aldrich et al. | 358/1.9 |
| 2007/0242081 A1* | 10/2007 | Jeong et al. | 345/606 |
| 2008/0024527 A1* | 1/2008 | Harada | 345/690 |
| 2008/0100337 A1* | 5/2008 | Kajigaya | 326/38 |
| 2008/0211741 A1* | 9/2008 | Itakura et al. | 345/63 |
| 2009/0028429 A1* | 1/2009 | Yokose et al. | 382/166 |
| 2010/0223237 A1* | 9/2010 | Mishra et al. | 707/693 |

FOREIGN PATENT DOCUMENTS

| | | |
|---|---|---|
| EP | 1879401 A1 | 1/2008 |
| JP | 10-006484 A | 1/1998 |
| JP | 2006-254199 A | 9/2006 |
| JP | 2006-262204 A | 9/2006 |
| KR | 10-2008-0093769 A | 10/2008 |

OTHER PUBLICATIONS

Communication dated May 28, 2013 from the State Intellectual Property Office of P.R. China in a counterpart application No. 200980144444.X.

* cited by examiner

METHOD AND APPARATUS FOR ENCODING/DECODING IMAGE IN BITMAP FORMAT USING REDUCED NUMBER OF BITMAP INDICES

CROSS-REFERENCE TO RELATED PATENT APPLICATION

This application claims priority from Korean Patent Application No. 10-2008-0138724, filed on Dec. 31, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to improving image quality, and more particularly, to encoding/decoding a graphic image in a bitmap format in order to improve image quality.

2. Description of the Related Art

A bitmap is a bit-type standard graphic file format in Windows and is generally used to represent graphic images in mobile devices or personal computers (PCs).

Bitmap processing apparatuses use many bitmap indices to represent gradient levels for naturally displaying boundaries of a graphic image such as a font or an icon.

Thus, the bitmap processing apparatuses require a solution for reducing the number of bitmap indices used.

SUMMARY OF THE INVENTION

The present invention provides a method and apparatus for encoding/decoding an image in a bitmap format in order to improve image quality.

According to an aspect of the present invention, there is provided a method of encoding an image, the method including: quantizing the image according to a predetermined bit-depth; creating a bitmap table by mapping the quantized image to a map table, and setting a bitmap index corresponding to each pixel location of the image with reference to the bitmap table; setting a fixed filter index regarding an image of each pixel or block by analyzing local characteristics of the image; and creating bitmap data by adding the filter index to the bitmap index.

According to another aspect of the present invention, there is provided a method of decoding an image, the method including extracting a bitmap index, a bitmap table, and a filter index from bitmap data; extracting the image mapped to the bitmap index from the bitmap table; and filtering the extracted image using a filter corresponding to the filter index.

According to another aspect of the present invention, there is provided an apparatus for encoding an image, the apparatus including a bitmap data creator for creating a bitmap table by using an image quantized to a predetermined bit-depth, and setting a bitmap index corresponding to each pixel location of the bitmap table; a filter index creator for setting a fixed filter index regarding an image of each pixel or block by analyzing local image characteristics of the image; and a merging unit for merging the bitmap index created by the bitmap data creator and the filter index created by the filter index creator.

According to another aspect of the present invention, there is provided an apparatus for decoding an image, the apparatus including a bitmap data restorer for extracting a pixel value mapped to a bitmap table according to a bitmap index; and an adaptive filtering unit for filtering a current pixel and neighboring pixels, which are extracted by the bitmap data restorer, according to a filter corresponding to a filter index provided to the bitmap index.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to accompanying drawings, wherein like numerals refer to like elements and repetitive descriptions will be avoided as necessary.

Figure 1:
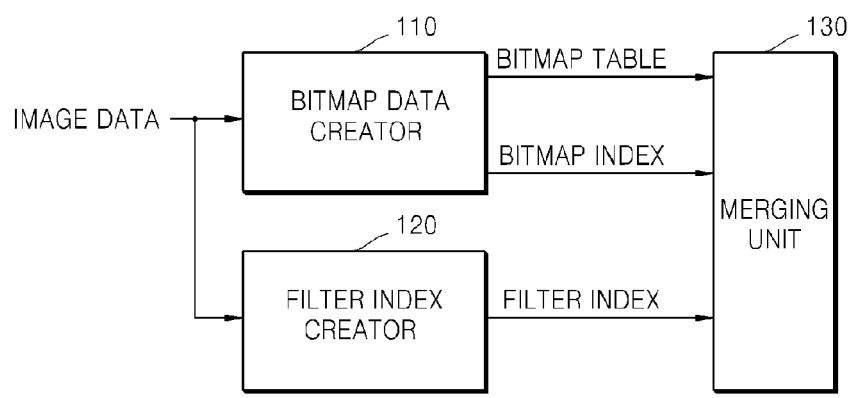
FIG. 1 is a block diagram of an apparatus for encoding an image in a bitmap format, according to an exemplary embodiment of the present invention.

FIG. 1 is a block diagram of an apparatus for encoding an image in a bitmap format, according to an exemplary embodiment of the present invention.

Referring to FIG. 1, the apparatus according to the current embodiment includes a bitmap data creator 110 and a filter index creator 120.

The bitmap data creator 110 quantizes a graphic image such as icons or fonts to a fixed bit-depth, creates a bitmap table by mapping the quantized image to a lookup table, and creates a bitmap index corresponding to each pixel location of the quantized image with reference to the bitmap table.

The filter index creator 120 creates a pre-defined filter index regarding each pixel (or block) of the image by using local characteristics between a current pixel (or a current block) and neighboring pixels (or neighboring blocks). In this case, an encoder and a decoder pre-define a filter corresponding to a filter index.

A merging unit 130 merges the bitmap table/bitmap index created by the bitmap data creator 110 and the filter index created by the filter index creator 120, pixel-by-pixel or block-by-block.

Ultimately, the apparatus according to the current exemplary embodiment creates bitmap data in which the filter index is added to the bitmap index.

Figure 2A:
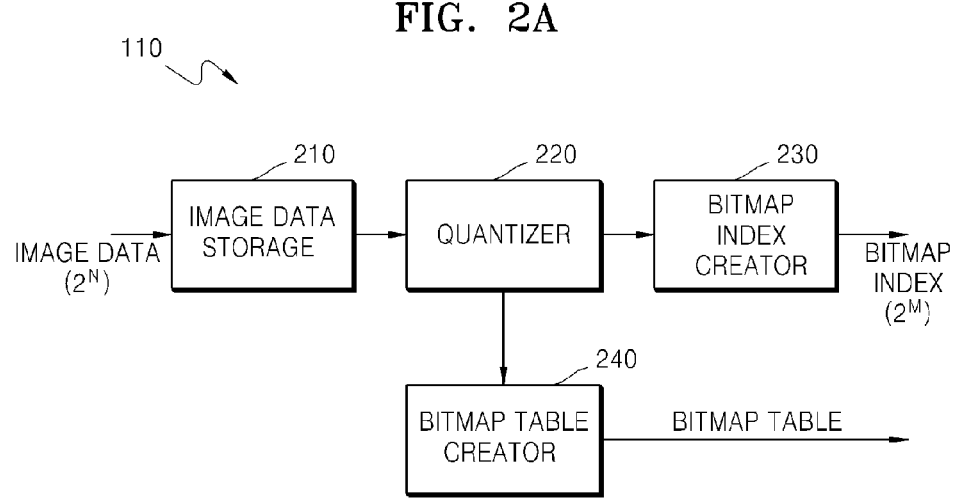
FIG. 2A is a block diagram of a bitmap data creator illustrated in FIG. 1, according to an exemplary embodiment of the present invention.

FIG. 2A is a block diagram of the bitmap data creator 110 illustrated in FIG. 1, according to an exemplary embodiment of the present invention.

Referring to FIG. 2A, the bitmap data creator 110 includes an image data storage 210, a quantizer 220, a bitmap index creator 230, and a bitmap table creator 240.

The image data storage 210 stores graphic image data such as icons or fonts in frames or fields. In this case, the graphic image data may be $2^N$ bits.

The quantizer 220 converts N-bit image data stored in the image data storage 210 into M-bit image data that is smaller than the N-bit image data, by using a quantization algorithm. For example, the quantizer 220 quantizes $2^{24}$-bit true color data into 256 or 128 R, G, and B combinations. Here, the 256 or 128 R, G, and B combinations are applied to a color table.

The bitmap table creator 240 maps R, G, and B or Y, Cb, and Cr combinations quantized by the quantizer 220 to a map table, and creates a bitmap table.

The bitmap index creator 230 converts the R, G, and B combinations quantized by the quantizer 220 into an index located in the bitmap table.

The current exemplary embodiment is applicable to gray scale data as well as color data.

Figure 2B:
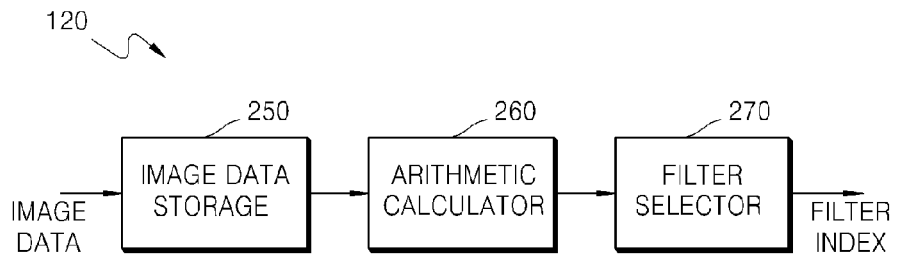
FIG. 2B is a block diagram of a filter index creator illustrated in FIG. 1, according to an exemplary embodiment of the present invention.

FIG. 2B is a block diagram of the filter index creator 120 illustrated in FIG. 1, according to an exemplary embodiment of the present invention.

Referring to FIG. 2B, the filter index creator 120 includes an image data storage 250, an arithmetic calculator 260, and a filter selector 270.

The image data storage 250 stores graphic image data such as icons or fonts in frames or fields.

Figure 2C:
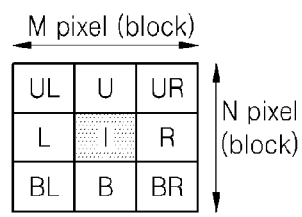
FIG. 2C is a diagram showing an example of local characteristics calculated by an arithmetic calculator of the filter index creator illustrated in FIG. 2B, according to an exemplary embodiment of the present invention.

The arithmetic calculator 260 analyzes local characteristics between a current pixel and neighboring pixels, which are stored in the image data storage 250. For example, as illustrated in FIG. 2C, the arithmetic calculator 260 extracts a brightness difference, an average value, a variance value, a minimum/maximum value, etc., between a current pixel I and M×N neighboring pixels U, B, L, R, UL, UR, BL, and BR.

The filter selector 270 selects a pre-defined filter for each pixel or each block and indexes the selected filter, based on local characteristic parameters analyzed by the arithmetic calculator 260. For example, the filter selector 270 selects a high-frequency pass filter if a difference between a current pixel value and neighboring pixel values is equal to or greater than a threshold value, and selects a low-frequency pass filter if the difference is lower than the threshold value. Also, a filter size and a filter coefficient are calculated based on the local characteristic parameters.

The pre-defined filter may include a low-pass filter, a high-pass filter, an average filter, a Gaussian filter, and a Laplacian filter.

Figure 3:
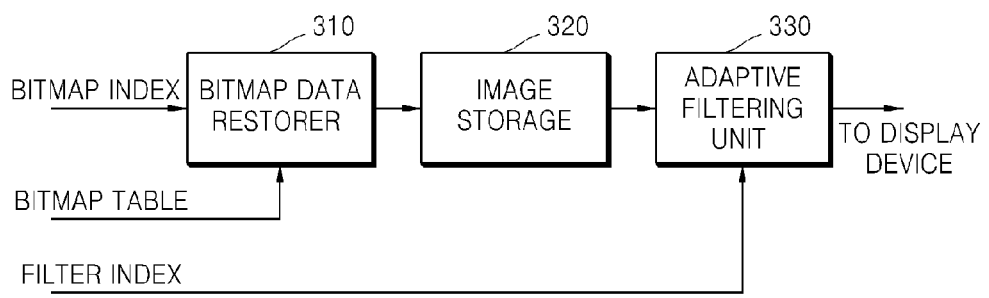
FIG. 3 is a block diagram of an apparatus for decoding an image in a bitmap format, according to an exemplary embodiment of the present invention.

FIG. 3 is a block diagram of an apparatus for decoding an image in a bitmap format, according to an exemplary embodiment of the present invention.

Referring to FIG. 3, the apparatus according to the current embodiment includes a bitmap data restorer 310, an image storage 320, and an adaptive filtering unit 330.

The bitmap data restorer 310 receives a bitmap table, sets bitmap table values in advance, and extracts local pixel values mapped to bitmap indices from the bitmap table.

The image storage 320 stores the local pixel values extracted by the bitmap data restorer 310.

The adaptive filtering unit 330 selects a pre-defined filter based on a filter index regarding each pixel or each block and received from an encoding apparatus, and filters a current pixel and neighboring pixels, which are stored in the image storage 320, by using the extracted filter.

For example, 5×5 pixels with reference to the current pixel are filtered from among pixels stored in the image storage 320. If a region around the current pixel corresponds to a flat region, a low-pass filter is selected, according to a corresponding filter index. Then, the flat region is filtered to a medium gradation by low-pass filtering the current pixel and the neighboring pixels. Meanwhile, if the region around the current pixel corresponds to a boundary region, a high-pass filter is selected, according to a corresponding filter index. Then, the boundary region is filtered sharply by high-pass filtering the current pixel and the neighboring pixels.

Thus, the adaptive filtering unit 330 may display boundaries of a graphic image such as a font or an icon naturally on a screen by adaptively filtering image data bitmapped by the bitmap data restorer 310.

The image data filtered by the adaptive filtering unit 330 is output to a display device such as a liquid crystal display (LCD) device.

Figure 4:
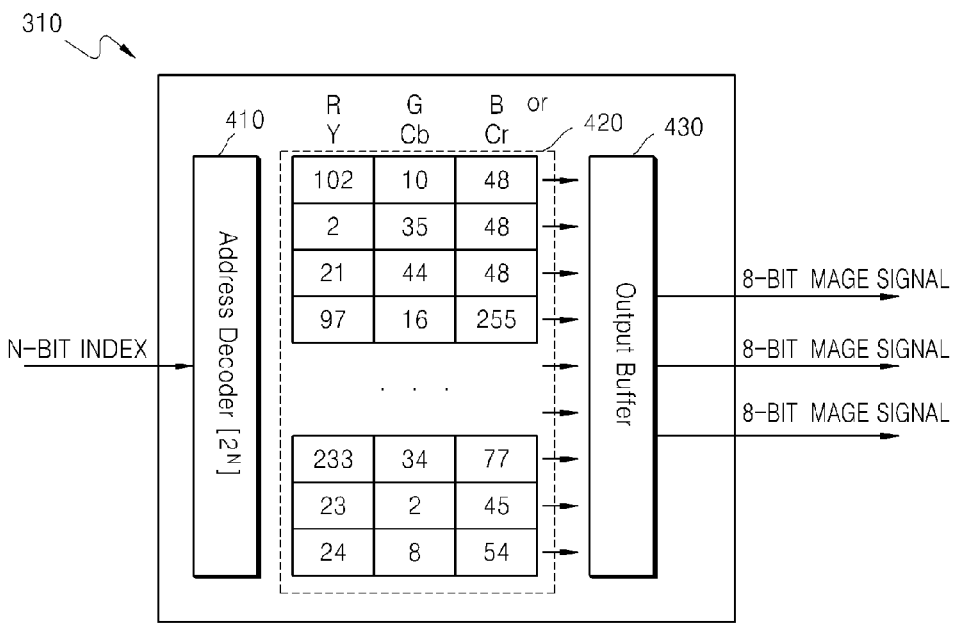
FIG. 4 is a block diagram of a bitmap data restorer illustrated in FIG. 3, according to an exemplary embodiment of the present invention.

FIG. 4 is a block diagram of the bitmap data restorer 310 illustrated in FIG. 3, according to an exemplary embodiment of the present invention.

Referring to FIG. 4, an address decoder 410 decodes N-bit bitmap indices into $2^N$ addresses.

A bitmap table unit 420 stores images of R, G, and B or Y, Cb, and Cr channels, which are mapped to the addresses of the address decoder 410, at $2^N$ levels.

An output buffer 430 outputs pixel values stored in the bitmap table unit 420 according to the $2^N$ addresses. For example, an 8-bit image signal is output with respect to each of the R, G, and B or Y, Cb, and Cr channels.

Figure 5:
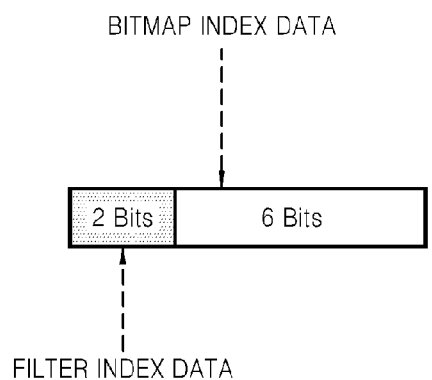
FIG. 5 is a diagram showing an exemplary merging operation of bitmap index data and filter index data, according to an exemplary embodiment of the present invention.

FIG. 5 is a diagram showing an exemplary merging operation which is performed by the merging unit 130 to merge bitmap index data and filter index data according to an exemplary embodiment of the present invention.

Referring to FIG. 5, newly defined 2-bit filter index data is added to original 6-bit bitmap index data. The bitmap index data and the filter index data are created pixel-by-pixel or block-by-block.

Figure 6A:
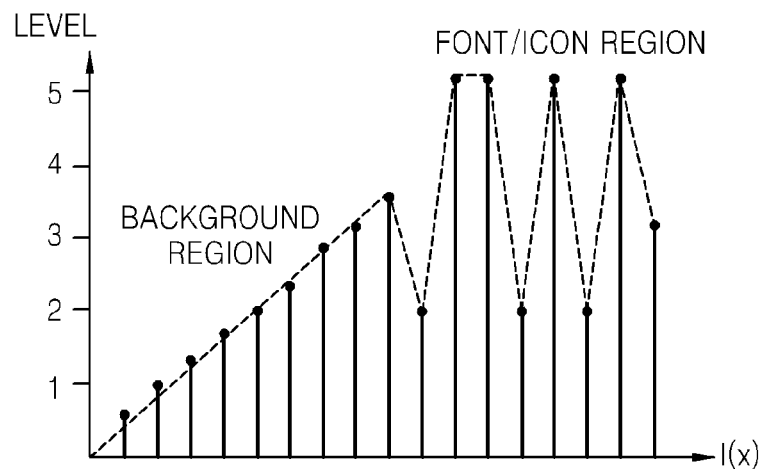
FIGS. 6A through 6C are graphs for describing a method of encoding/decoding an image in a bitmap format, according to an exemplary embodiment of the present invention.
Figure 6B:
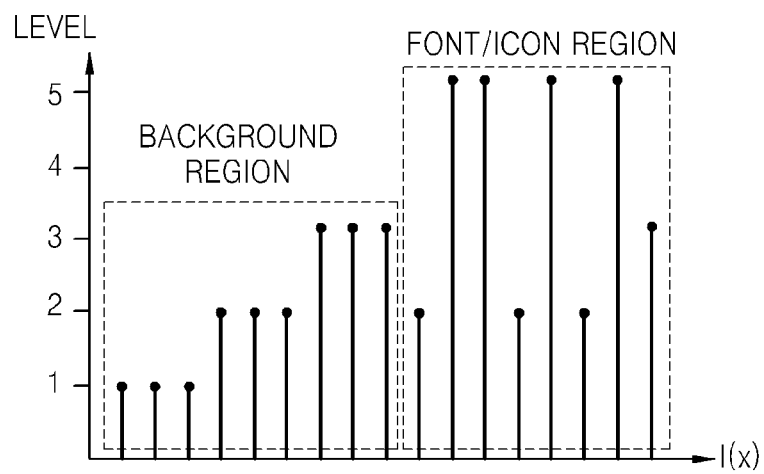
Figure 6C:
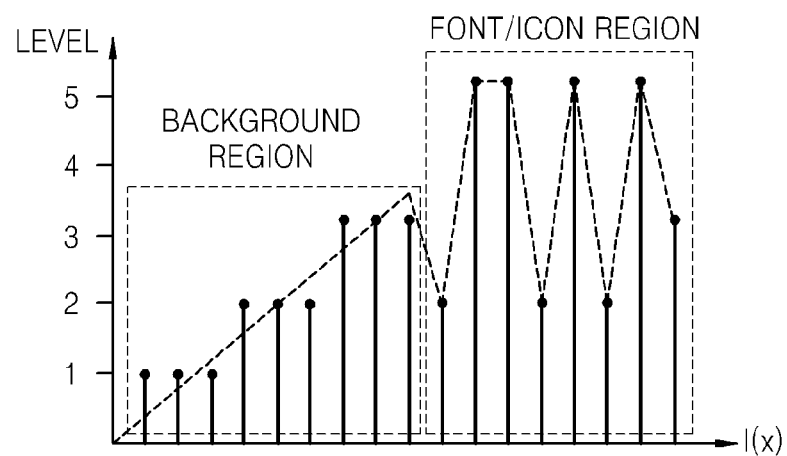

FIGS. 6A through 6C are graphs for describing a method of encoding/decoding an image in a bitmap format, according to an exemplary embodiment of the present invention.

FIG. 6A illustrates original image data digitized on an image line of the x-axis.

Referring to FIG. 6A, the original image data is divided into a background region of a low-frequency and a font/icon region of a high-frequency.

FIG. 6B illustrates image data encoded into representative level values in a bitmap format.

Referring to FIG. 6B, bitmap indices "1 1 1 2 2 2 3 3 3 2 5 5 2 5 2 5 3" are allocated to pixels on the image line of the x-axis based on representative level values "1, 2, 3, 4, and 5".

In this case, the bitmap indices "1 1 1 2 2 2 3 3 3" correspond to the image data of the background region and the bitmap indices "2 5 5 2 5 2 5 3" correspond to the image data of the font/icon region.

Thus, filter index values "0 0 0 0 0 0 0 0 0" corresponding to a low-pass filter are provided to the bitmap indices "1 1 1 2 2 2 3 3 3" corresponding to pixels of the background region. Also, filter index values "1 1 1 1 1 1 1 1 1" corresponding to a high-pass filter are provided to the bitmap indices "2 5 5 2 5 2 5 3" corresponding to pixels of the font/icon region.

FIG. 6C illustrates image data adaptively filtered by adaptive filtering unit 330 according to filter indices.

Referring to FIG. 6C, the pixels of the background region are low-pass filtered by using a low-pass filter corresponding to the filter index values "0 0 0 0 0 0 0 0 0" and the pixels of the font/icon region are high-pass filtered by using a high-pass filter corresponding to the filter index values "1 1 1 1 1 1 1 1 1".

Accordingly, the image data of the background region is filtered to a medium gradation and the image data of the font/icon region is filtered sharply. However, a related art image decoding apparatus merely restores image data based on the image data illustrated in FIG. 6B, and thus, the restored image data differs from original image data.

Ultimately, the adaptively filtered image data, as shown in FIG. 6C, is restored according to an exemplary embodiment of the present invention to be similar to the original image data illustrated in FIG. 6A.

Figure 7:
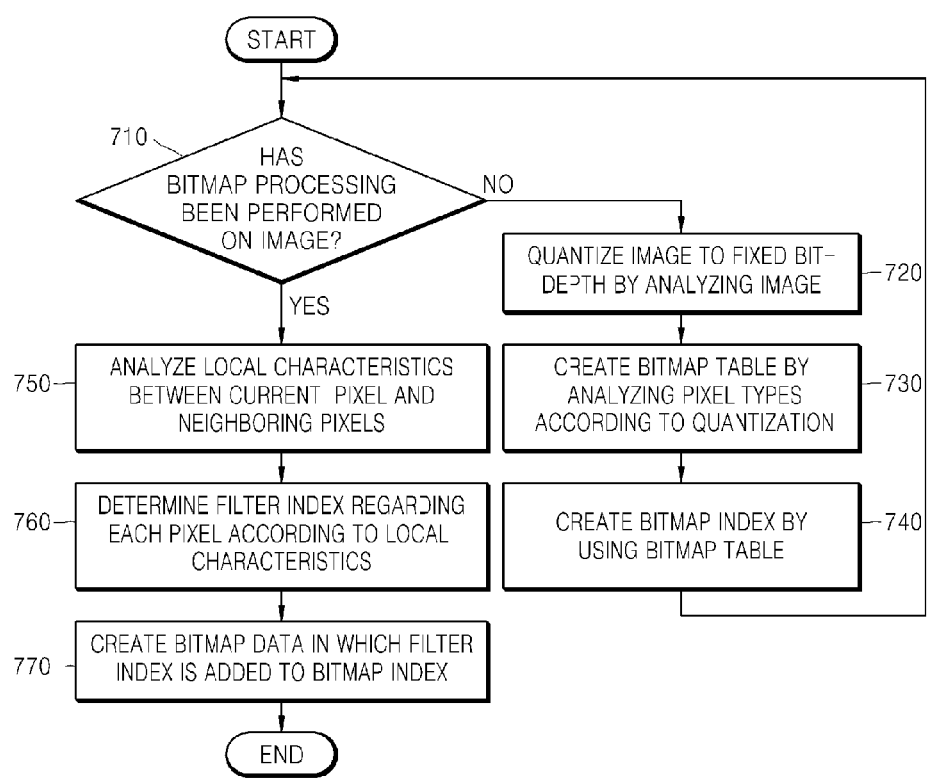
FIG. 7 is a flowchart of a method of encoding an image in a bitmap format, according to an exemplary embodiment of the present invention.

FIG. 7 is a flowchart of a method of encoding an image in a bitmap format, according to an exemplary embodiment of the present invention.

Referring to FIG. 7, initially, a graphic image such as a font or an icon is input through a graphic user interface (GUI).

Then, it is checked whether bitmap processing using a quantization algorithm is performed on the input image to a fixed bit-depth (operation 710).

In this case, if the bitmap processing has not been performed on the input image, bitmap processing is performed in operations 720, 730 and 740. First, the input image is quantized to the fixed bit-depth (operation 720).

Then, pixel types (e.g., R, G, and B or Y, Cb, and Cr) according to quantization are analyzed and a bitmap table is created by mapping the quantized image to a map table (operation 730).

Then, a bitmap index corresponding to each pixel location in the bitmap table is created with reference to the bitmap table (operation 740).

If it has been determined in operation 710 that the bitmap processing has been performed on the input image, the bitmap index and the bitmap table are already created.

Thus, after the bitmap processing is performed on the input image, local image characteristics between a current pixel and neighboring pixels are analyzed (operation 750).

Then, a filter index regarding each pixel or block is determined according to the local image characteristics (operation 760).

Lastly, pixel or block-based bitmap data in which the filter index is added to the bitmap index is created (operation 770).

Figure 8:
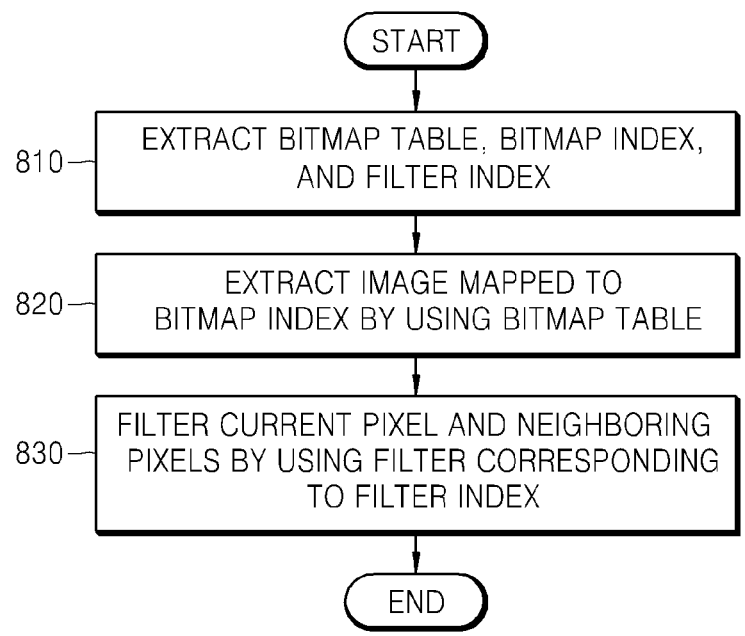
FIG. 8 is a flowchart of a method of decoding an image in a bitmap format, according to an exemplary embodiment of the present invention.

FIG. 8 is a flowchart of a method of decoding an image in a bitmap format, according to an exemplary embodiment of the present invention.

Referring to FIG. 8, initially, bitmap data is received from an image encoding apparatus and a bitmap table, $2^N$ bitmap indices, and $2^N$ filter indices are extracted (operation 810).

Then, bitmap table values are set and pixel values mapped to the bitmap indices are extracted from the bitmap table (operation 820).

Then, a current pixel and neighboring pixels are filtered by using a filter corresponding to a filter index regarding each pixel or each block (operation 830).

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy discs, and optical data storage devices. In another exemplary embodiment, the computer readable recording medium can also be distributed over network coupled computer systems so that the computer readable code is stored and executed in a distributed fashion.

According to the present invention, bitmap indices used to represent boundaries of a font or an icon may be reduced and an image close to true colors may be represented by allocating surplus bitmap indices to colors and gradations even when almost the same bandwidth as a related art method is used.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image, the method comprising:
generating a bitmap table by mapping a quantized image, that is quantized according to a first bit-depth, to a map table, and setting a bitmap index corresponding to each pixel location of the quantized image with reference to the bitmap table;
allocating the bitmap index having a second bit-depth to each pixel based on representative level values, the second bit-depth being smaller than the first bit-depth;
determining a filter index corresponding to a pre-defined filter type for each pixel of the image according to local image characteristics by analyzing local characteristics of the image; and
generating bitmap data for each pixel of the image by adding the filter index to the bitmap index.

2. The method of claim 1, wherein the generating the bitmap table and the setting the bitmap index comprise:
quantizing image data input through a user interface to the first bit-depth to generate the quantized image;
generating the bitmap table by mapping the quantized image data to a map table, pixel-by-pixel; and
generating the bitmap index representing an image location of each pixel of the quantized image stored in the bitmap table.

3. The method of claim 1, wherein the determining the filter index comprises:
selecting the pre-defined filter type for each pixel of the image according to local image characteristics between a current pixel and neighboring pixels; and
indexing the selected filter.

4. The method of claim 3, wherein the local characteristics comprise at least one of a brightness difference between the current pixel and the neighboring pixels and an average value between the current pixel and the neighboring pixels.

5. The method of claim 3, wherein filter information corresponding to the filter index is shared by an encoder and a decoder.

6. The method of claim 3, wherein the selecting the filter comprises:
selecting a high-frequency pass filter if a difference between a current pixel value and neighboring pixel values is equal to or greater than a threshold value; and
selecting a low-frequency pass filter if the difference between the current pixel value and the neighboring pixel values is lower than the threshold value.

7. The method of claim 3, wherein the generating the bitmap data comprises adding the filter index to the bitmap index on a pixel-by-pixel basis.

8. The method of claim 1, wherein the generating the bitmap table comprises:
converting received image data comprising N bit indices into quantized image data comprising M<N bit indices.

9. The method of claim 1, wherein the generating the bitmap table comprises:
quantizing received color image data into R, G, B combinations; and
converting the R, G, B combinations into the bitmap index of the bitmap table.

10. The method of claim 1, wherein the second bit-depth is equal to 6.

11. A method of decoding an image, the method comprising:
extracting a bitmap index having a first bit-depth, a bitmap table, and a filter index corresponding to a pre-defined filter type for each pixel of the image, from bitmap data which has been generated for each pixel of the image;
extracting an image mapped to the bitmap index from the bitmap table and storing the extracted image in a storage unit; and
filtering the extracted image based on the pre-defined filter type corresponding to the filter index,
wherein the bitmap index is allocated to each pixel based on representative level values,
the bitmap data comprises merged bitmap index and filter index, and
the image is decoded to a second bit-depth which is greater than the first bit-depth.

12. The method of claim 11, wherein the filtering of the extracted image comprises filtering a current pixel value and neighboring pixel values by using the pre-defined filter type corresponding to the filter index.

13. A method of encoding and decoding an image, the method comprising:
encoding an image by:
generating a bitmap table by mapping a quantized image, that is quantized according to a first bit-depth, to a map table, and setting a bitmap index corresponding to each pixel location of the quantized image with reference to the bitmap table;
allocating the bitmap index having a second bit-depth to each pixel based on representative level values, the second bit-depth being smaller than the first bit-depth;
setting a fixed filter index corresponding to a pre-defined filter type for each pixel of the image by analyzing local characteristics of the image; and
generating bitmap data for each pixel of the image by adding the filter index to the bitmap index; and
decoding an encoded image by:
extracting the bitmap index, the bitmap table, and the filter index from the bitmap data;
extracting the encoded image mapped to the bitmap index from the bitmap table; and
filtering the extracted encoded image based the pre-defined filter type corresponding to the filter index.

14. An apparatus for encoding an image, the apparatus comprising a processor comprising:
a bitmap data creator which generates a bitmap table by using a quantized image that is quantized to a first bit-depth, and sets a bitmap index having a second bit-depth and corresponding to each pixel location of the quantized image with reference to the bitmap table so that the bitmap index is allocated to each pixel based on representative level values, the second bit-depth being smaller than the first bit-depth;
a filter index creator which sets a fixed filter index corresponding to a pre-defined filter type for each pixel of the image by analyzing local image characteristics of the image; and
a merging unit which merges the bitmap index created by the bitmap data creator and the filter index created by the filter index creator.

15. The apparatus of claim 14, wherein the filter index creator comprises:
an arithmetic calculator which extracts local image characteristic parameters between a current pixel and neighboring pixels; and
a filter selector which selects a pre-defined filter for each pixel according to the local image characteristic parameters extracted by the arithmetic calculator and indexes the selected filter.

16. An apparatus for decoding an image, the apparatus comprising a processor comprising:
a bitmap data restorer which extracts a pixel value mapped to a bitmap table according to a bitmap index having a first bit-depth; and
an adaptive filtering unit which filters a current pixel and neighboring pixels, which are extracted by the bitmap data restorer, according to a pre-defined filter type for each pixel of the image corresponding to a filter index assigned to the bitmap index,
wherein the bitmap index is allocated to each pixel based on representative level values,
the bitmap index, the bitmap table, and the filter index are extracted from bitmap data which has been generated for each pixel of the image,
the bitmap data comprises merged bitmap index and filter index, and
the image is decoded to a second bit-depth which is greater than the first bit-depth.

17. A non-transitory computer readable recording medium having recorded thereon a computer program for executing the method of claim 1.

18. A non-transitory computer readable recording medium having recorded thereon a computer program for executing the method of claim 11.

* * * * *